(12) United States Patent
Rust

(10) Patent No.: US 10,654,210 B2
(45) Date of Patent: May 19, 2020

(54) PLANETARY ROLLER EXTRUDER

(71) Applicant: Harald Rust, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 193 days.

(21) Appl. No.: 15/935,206

(22) Filed: Mar. 26, 2018

(65) Prior Publication Data

US 2018/0281263 A1 Oct. 4, 2018

Related U.S. Application Data

(63) Continuation-in-part of application No. PCT/EP2016/000666, filed on Apr. 27, 2016.

(30) Foreign Application Priority Data

Sep. 27, 2015 (DE) ........................ 10 2015 012 435

(51) Int. Cl.
*B29C 48/44* (2019.01)
*B29C 48/425* (2019.01)
(Continued)

(52) U.S. Cl.
CPC ............ *B29C 48/425* (2019.02); *B29B 7/485* (2013.01); *B29B 7/487* (2013.01); *B29B 7/488* (2013.01);
(Continued)

(58) Field of Classification Search
CPC .................................................... B29C 48/44
(Continued)

(56) References Cited

U.S. PATENT DOCUMENTS 2,581,451 A * 1/1952 Sennet ................... B29C 48/03
366/85
2,802,238 A * 8/1957 Colombo ............... B29C 48/64
366/85

(Continued)

FOREIGN PATENT DOCUMENTS

CN 1398219 A 2/2003
CN 201872294 U 6/2011
(Continued)

OTHER PUBLICATIONS

SIPO office action in related application CN201680004762, Global Dossier dated Nov. 19, 2019.
(Continued)

*Primary Examiner* — David L Sorkin
(74) *Attorney, Agent, or Firm* — Smartpat PLC

(57) ABSTRACT

A planetary roller extruder includes a housing with an internal housing toothing. A central spindle is disposed in the housing and has an external central spindle toothing. A plurality of planetary spindles are disposed about the central spindle and in the housing. Each of the planetary spindles has an external planetary spindle toothing configured to mesh with the internal housing toothing and the external central spindle toothing. A drive is configured to rotate the central spindle. The drive includes a drive journal connected to the central spindle to permit transmission of a driving force from the drive to the central spindle. The drive journal includes a bore. The bore has internal projections configured to engage with the external central spindle toothing to secure the central spindle to the drive journal by a screw-type connection.

20 Claims, 6 Drawing Sheets

(51) Int. Cl.
  *B29C 48/435* (2019.01)
  *B29C 48/505* (2019.01)
  *B29C 48/585* (2019.01)
  *B29C 48/68* (2019.01)
  *B29C 48/685* (2019.01)
  *B29C 48/80* (2019.01)
  *B29B 7/48* (2006.01)
  *B29C 48/395* (2019.01)
  *B29C 48/25* (2019.01)
  *B29C 48/625* (2019.01)

(52) U.S. Cl.
  CPC .......... *B29C 48/25* (2019.02); *B29C 48/2564* (2019.02); *B29C 48/397* (2019.02); *B29C 48/435* (2019.02); *B29C 48/505* (2019.02); *B29C 48/507* (2019.02); *B29C 48/585* (2019.02); *B29C 48/683* (2019.02); *B29C 48/688* (2019.02); *B29C 48/832* (2019.02); *B29C 48/834* (2019.02); *B29C 48/625* (2019.02)

(58) Field of Classification Search
  USPC .......................................... 366/85, 100, 301
  See application file for complete search history.

(56) References Cited

U.S. PATENT DOCUMENTS

| | | | | |
|---|---|---|---|---|
| 3,310,837 | A | * | 3/1967 | Wittrock ............... B29C 48/425 366/76.1 |
| 4,176,967 | A | * | 12/1979 | Brinkmann ............. B29B 7/485 366/83 |
| 4,268,176 | A | * | 5/1981 | Muller .................... B29B 7/485 366/83 |
| 4,303,344 | A | * | 12/1981 | Muller .................... B29C 48/38 366/76.3 |
| 4,889,430 | A | | 12/1989 | Mueller |
| 2003/0012077 | A1 | | 1/2003 | Behling |
| 2015/0283728 | A1 | | 10/2015 | Rust |

FOREIGN PATENT DOCUMENTS

| | | |
|---|---|---|
| CN | 203198211 U | 9/2013 |
| CN | 104736317 A | 6/2015 |
| DE | 2521774 A1 | 11/1976 |
| DE | 3815061 C1 | 4/1989 |
| DE | 4433487 C2 | 7/1998 |
| DE | 20315905 U1 | 2/2005 |
| DE | 102004050447 A1 | 4/2006 |
| DE | 102007027212 A1 | 12/2008 |
| DE | 202010017571 U1 | 2/2012 |

OTHER PUBLICATIONS

SIPO search report in related application CN201680004762, Global Dossier dated Nov. 8, 2019.

* cited by examiner

PLANETARY ROLLER EXTRUDER

CONTINUING APPLICATION DATA

This application is a Continuation-In-Part application of International Patent Application No. PCT/EP2016/000666, filed on Apr. 27, 2016, which claims priority from Federal Republic of Germany Patent Application No. 10 2015 012 435.8, filed on Sep. 27, 2015. International Patent Application No. PCT/EP2016/000666 was pending as of the filing date of this application. The United States was an elected state in International Patent Application No. PCT/EP2016/000666.

BACKGROUND

1. Technical Field

The present application relates to planetary roller extruders.

2. Background Information

Background information is for informational purposes only and does not necessarily admit that subsequently mentioned information and publications are prior art.

Extruders are generally used to process many different kinds of materials, collectively referred to as feedstock or feed material. One type of feed material is plastic. Extruders are commonly used for the processing and treatment of plastics for many varied uses, such as, for example, molded articles, workpieces, blocks, sheets, films, webs, coatings, pipes, tubes, bars, rods, profiles, tapes, cords, wires, bristles, nets adhesives, lacquers, pastes, glues, sealants, binders colorants, plaster, putty, casting and sealing compounds, melt and coating materials, gels, threads, fibers, yarns, silks, strands, matting, fleece, fabrics.

The plastics may comprise monomers and/or polymers. A mixture is often the case, wherein mixtures with substances other than plastics can also be made or processed. This may be the case for manufacturing plastic foam.

Moreover, other plasticising or already plastic substances may be processed in an extruder. Such substances include, for example, foodstuffs and pharmaceuticals, as well as chemicals.

With an extruder, the feedstock can be melted, mixed, or homogenized and dispersed. Furthermore, the feedstock can also be heated or cooled. For heating or cooling purposes, cooling ducts or heating ducts are located in the extruder casing, and optionally also in the spindles. The deformation of the feedstock brought about by the extruder spindles also results in considerable heating.

Moreover, a considerable pressure generally may need to be generated or should be generated. For example, in the production of plastic foam, it is very important that a considerable pressure can be built up in the extruder in order to prevent, restrict, and/or minimize foaming in the extruder. Other reasons for the pressure build-up can depend on the material or on the process.

Various designs are known for extruders. Three of the most common designs are single screw extruders, twin screw extruders, and planetary roller extruders.

Single screw extruders are extruders in which a single screw rotates in a housing. Twin screw extruders are extruders in which two screws rotate in a housing, the screws being arranged parallel or substantially to one another and intermesh with one another. Planetary roller extruders generally have a central screw or central spindle or sun spindle, about which a plurality of planetary spindles are rotated within a housing.

The various designs may also be combined. For example, the primary extruder of a tandem unit can be provided by a single screw extruder or twin screw extruder, whereas the secondary extruder is a planetary roller extruder. The primary extruder and the secondary extruder can be operated with different rotational speeds. The combination of different extruder systems can also be realized in a single extruder. In this design, the extruder systems combined together provide various extruder sections in the one extruder. These sections may correspond to the processing sections of the extruder, but do not have to. Important processing sections in the processing of plastics are, for example, feeding the plastic, melting, homogenizing/dispersing, and cooling the melt to the extrusion temperature.

Usually a common screw is used when various extruder systems are combined in a single extruder or extruder system. For example, the screw of the planetary roller extruder section/planetary roller module is seated at the drive end held in a gear journal. The gear journal is connected to the drive but is also a bearing for the screws/central spindles. The central spindle, with a part that is designed like a splined shaft, engages into a corresponding opening of the gear journal. The opening of the gear journal has a matching recess for each spline on the end of the central spindle.

The extruder sections are frequently also depicted in the extruder housing. The housing sections are clamped together at the ends with flanges.

Hereinafter, extruders will be mentioned, and includes both the combination with similar or other extruders as well as the sectional combination of different extruder systems in one extruder. The combination of extruder sections of the same system is likewise included. In other words, the term "extruder" can be used to refer to various types and designs of extruders, including modular, sectional, integral, in series, or otherwise.

The present application is mainly concerned with planetary roller extruders. These extruders differ quite significantly from other extruders: a number of planetary spindles rotate around a central spindle. The planetary spindles, like the central spindle, have a toothing, usually a helical toothing, in one possible exemplification in the form of an involute toothing.

Furthermore, the extruder housing is internally toothed, in one possible exemplification equipped with a toothed liner.

The planetary spindles intermesh with both the central spindle and the extruder housing or the liner.

Under the flank pressure of the toothing, the planetary spindles would be moved outwards in an axial direction if the axial pressure were not absorbed by a thrust bearing or a thrust ring. Current extruders have the thrust ring at the end of the housing, such that the thrust ring is put in place when the associated housing is clamped/screwed with its above-described flange.

The thrust ring surrounds the central spindle with a greater or lesser interspace. The feedstock processed or treated in the planetary roller extruder is conveyed through the gap between thrust ring and central spindle. This operational mode has proven successful.

Some extrusion units have such planetary roller extruder sections. Each planetary roller extruder section has a central spindle, a housing and planetary spindles that rotate on the central spindle and in the internally toothed housing. At the same time the thrust rings prevent, restrict, and/or minimize the planetary spindles from moving in the axial direction out of the housing. In this regard, the planetary spindles slide on or against the thrust rings. The thrust rings are held between the ends of the housings of the various planetary roller extruder sections.

Between the thrust rings and the central spindle there is a gap, through which the melt from one extruder section passes into the next. A common central spindle is provided for the planetary roller extruder sections. The formation of a gap between the thrust ring and the central spindle is beneficial if no toothing on the central spindle is provided in the gap.

Some planetary roller extruders have various planetary roller extruder sections. A common central spindle extends through the sections.

The planetary roller extruders are more complex than other extruder designs and are therefore more expensive.

OBJECT OR OBJECTS

An object of the present application is to manufacture and operate the planetary roller extruders in a more economical manner.

SUMMARY

This object can be achieved by at least one of the exemplifications disclosed herein.

In this regard, the present application addresses itself to the screw or central spindle that penetrates the sections of the extruder.

According to the present application, a new economic efficiency is achieved in that the screws/central spindles are uniformly toothed over the whole length. Consequently the central spindles can be cut to length from a starting material that has already been provided with the required and/or desired toothing. This significantly simplifies the manufacturing.

However, such screws/central spindles are not connected in the usual manner to the drive journal. The usual way is a spline connection. In the spline connection a connection piece is encompassed by other connection pieces, the inner connection piece being provided on the outer casing with a plurality of longitudinally running grooves. The external connection piece has grooves that correspond to the inner casing. Shear-resistant wedges are inserted into the grooves. The wedges are usually inserted into the grooves of the inner connection piece and together with the inner connection piece are pushed into the outer connection piece.

In the spline connection the shear resistance of the wedges generally determines the transferable torque with the spline connection.

In regard to the coupling the present application takes a completely different approach, in that, according to the present application, a screw fitting is provided between the spindles/central spindles and the drive journal. In other words, for example, a portion of the spindle can include a toothing or threading on the exterior thereof, and the drive journal can include a toothing or threading on the interior thereof. The toothings or threadings can be designed to mesh as the spindle is essentially screwed into the drive journal to secure the spindle to the drive journal both for mounting the spindle in place and for the transmission of torque.

The drive journal may surround the screw/central spindle in one possible exemplification. This consideration assumes that the screw/central spindle in the coupling area can carry a screw thread on the outer casing. Here, a design according to the present application is considered as a screw thread, to which a compatible screw nut or a compatible internal screw thread can be produced in a drive journal, such that the screw or central spindle can be screwed into the drive journal. An essential characteristic of the screw thread is a uniform lead of the screw thread in the coupling area/screwing area.

A normal toothing or standard toothing is in one possible exemplification provided in the coupling area/screwing area. In contrast to the normal toothing or standard toothing, special toothings, such as porcupine toothings, stipulate or require recesses on the teeth.

The internal screw thread in the drive journal can be created in a conventional manner. However, this entails some effort if a standard cutting tool is unavailable for the toothing.

The internal screw thread in a drive journal is in one possible exemplification manufactured by erosion or spark erosion (electrical discharge machining).

In known publications on eroding, a process is described for the internal toothing of a planetary roller extruder housing/liner in which an electrode replicates the cross section of the planetary spindles and observes a required and/or desired distance to the inner surface of the liner for the erosion. This electrode is moved back and forth while rotating in the housing. The rotation corresponds to the thread lead of the involute toothing in the housing. The housing stands in a bath filled with dielectric fluid and such different voltages act on the housing and on the electrode that sparks jump from the housing to the electrode. With the sparks, material is removed from the inner surface of the housing. The material removal depends on various factors. Important factors are the voltage and the gap between the housing and the electrode. The material removal by means of electrical discharge machining continues until the desired toothing has been created on the inner surface.

The generated heat is removed by circulating and cooling the dielectric fluid.

The electrode is, in one possible exemplification, made of graphite. However, other materials, such as copper, brass, tungsten, and stellite, may also be considered for the electrode.

This process can be performed using electrodes that are provided with a taper or a curvature on the front end (electrode head) as the electrode is brought into the housing liner or as the electrode is brought into the housing. A combination of tapering and curvature is preferred. In this regard, the curvature and taper are in one possible exemplification matched to the size of the extruder and to the toothing module.

In the present case, the pitch diameter of the inner toothing of the extruder housing is used to identify the size. Size 50 refers to an extruder housing whose inner toothing has a pitch diameter of 50 millimeters; size 150 has a pitch diameter of 150 millimeters; size 350 has a pitch diameter of 350 millimeters; and size 500 has a pitch diameter of 500 millimeters. Other possible sizes would follow a similar naming convention.

The following preferred radii for the curvatures are given as a function of the size:

| Size WZ | | curvature radius | |
|---|---|---|---|
| minimum | maximum | minimum | maximum |
| 50 | 150 | 2 mm | 6 mm |
| 150 | 300 | 5 mm | 8 mm |
| 350 | 400 | 5 mm | 10 mm |
| 500 | 1000 | 5 mm | 20 mm |

The curvature and/or taper already shows an effect if it begins above the tooth root (between tooth crest and tooth root) of the toothing or begins at the tooth root. In at least one possible exemplification, the curvature actually begins below the tooth root. This means that the smallest electrode diameter on the curvature is smaller than the diameter of the electrode on the tooth root of the toothing. The same applies if a taper is provided on the electrode head. The same also applies for a combination of taper and curvature on the electrode head.

The further the curvature and/or taper extends on the electrode coating, the faster an advantageous erosion power can be achieved.

For small sizes, the curvature and/or taper, in one possible exemplification, extends for at least 8 mm and by at least 30 millimeters for larger sizes—starting from the front surface of the electrode head—along the electrode coating.

In order to obtain a uniform toothing, the further the curvature and/or taper extends on the electrode coating, the further the electrode may be passed through the electrode housing to be treated or through the liner to be treated.

For small sizes, the curvature and/or taper, in one possible exemplification, extends for 15 millimeters at most and by 60 millimeters at most for larger sizes—starting from the front surface of the electrode head—along the electrode coating.

In the case of a taper and curvature—starting from the front surface of the electrode head—in one possible exemplification the curvature is initially provided and then the taper. A smooth transition from the curvature to the taper is required and/or desired.

The taper as well as the curvature enable the electrode to be guided into the housing liner or into the housing and be immediately or substantially immediately and optimally or substantially optimally utilized for the erosion process. Moreover, the wear on the electrode is reduced.

If the electrode is moved along its z-axis (longitudinal axis) against the housing or its liner into the erosion position then greater erosion surfaces are created than without tapering and without curvature. The greater erosion surface affords an overall greater removal performance/erosion performance, even for constant or substantially constant removal performance/erosion performance per unit of surface.

By taking into account the above described erosion gap the diameter of the electrode can fill up the inner space of the inner toothed extruder housing or of the inner toothed liner of the extruder housing, such that the inner toothing is created by one or more longitudinal movements/stroke movements of the electrode through the housing or its liner. When manufacturing the inner toothing with a single stroke movement, the electrode is provided with a long taper and/or curvature on the extruder head, such that the toothing is completed by progressive deepening of the tooth spaces in one movement/stroke.

In this regard the electrode works similarly to a screw cutter.

When manufacturing the toothing in a plurality of steps, then a plurality of electrodes can be used, for example with one electrode for coarse machining and another electrode for a subsequent precision machining.

When machining the extruder housing or the liner it may be advantageous to use disc-shaped electrodes. Disc-shaped electrodes are in one possible exemplification 30 millimeters to 120 millimeters thick. The 30-millimeter thickness is for a small size; the 120-millimeters thickness is for a large size. With smaller sizes the disc-shaped electrodes of lower thickness still have adequate strength. With larger sizes a greater thickness may need to be or should be considered.

The above disc-shaped electrodes are adequately maintained with a bar on a guidable slide on the side of the extruder housing or on the side of the liner. By moving the slide the electrode can be immersed in the extruder housing or liner. By simultaneously turning the bar the electrode can be given the movement needed and/or desired to generate a toothing with a desired inclination of the teeth.

With a single electrode the work can be carried out in another way, namely by mounting the rotatable bar in an eccentric, rotatable bearing seat. The bar maintains the electrode. By rotating the bearing seat the distance of the bar to the inner wall of the extruder housing or to the inner wall of the liner for the extruder housing can be changed. This can be utilized in order to continually or substantially continually adjust the electrode further against the inner wall of the housing or against the inner wall of the liner and to deepen the tooth spaces until the inner surface of the extruder housing exhibits the desired toothing.

With a disc-shaped electrode that can be adjusted against the inner wall of the housing or against the inner wall of the liner and which can be guided through the housing opening and out of the housing again or be guided through the opening of the liner and out of the liner again, it is advantageous if both ends of the disc-shaped electrode are provided with a taper and/or curvature. The electrode can then execute a working stroke in each direction of movement. Thus, for example, by increasing the voltage, a further working stroke results as the electrode moves backwards.

The electrode that can be adjusted against the inner wall of the housing or against the inner wall of the liner in one possible exemplification has a length that is equal to or slightly greater than the length of the housing or the length of the liner. After the electrode has been positioned in the extruder housing or in the liner, said electrode can be shifted like a planetary spindle on the inner surface of the housing or on the inner surface of the liner. The required and/or desired drive connection of the electrode can be effected with computerized digitally controlled drives.

The eccentric bearing seat can be adjusted with a stepper motor.

The erosion device is at least partially, in one possible exemplification, electronically controlled. The required and/or desired precision can be readily maintained with known control elements.

The electrical discharge machining process for extruder housings/liners on the inner toothing of drive journals involves first drilling a hole into the drive journal. The hole can be a blind hole or a through boring. The depth of the blind hole is chosen such that the tools provided for the subsequent machining have sufficient access. On sinking a through boring, a stepped bore is advantageous because a central spindle or screw that is subsequently screwed into the bore equipped with inner toothing can butt against a constriction of the bore.

The subsequent machining on the drilling in this process may comprise solely electrical discharge machining. However, the subsequent machining may also include an intermediate step prior to employing the electrical discharge machining. In at least one possible exemplification, a coarse preparation of the inner toothing is foreseen as the intermediate step. The final machining of the inner toothing is then reserved to the electrical discharge machining. The intermediate step can involve machining, for example by milling or planing or the like. With smaller sizes of extruder there results in comparison to larger extruder sizes smaller teeth on the screws/central spindles.

In order to introduce such teeth as the inner toothing, a comparatively low amount of material may have to be removed. This can be readily done with electrical discharge machining. Moreover, the operating space in smaller bores of the drive journal is small, such that machining is complicated and is made unnecessary and/or undesired by electrical discharge machining alone.

For larger extruder sizes, the amount of material to be removed for the production of the inner toothing increases many times over or proportionally. It can then be economically reasonable to make use of an above-described intermediate step between the drilling and the electrical discharge machining.

The electrode can have various shapes. For example, the electrode for the electrical discharge machining of the inner toothing, in one possible exemplification, comprises in the cross section an image of the end of the screw/central spindle to be clamped into the drive journal. In contrast, in the side view, the electrode has a disc-shape, whereas the screw/central spindle has a longitudinally extended cylinder shape. The electrode according to the present application can be produced by the same mechanical machining as the screw/central spindle. The usual mechanical machining is carried out by machining on a lathe and by milling the toothing. It does not cause any difficulty when instead of the longitudinally extended cylinder form a disc of the same cross section is machined.

The thinner the disc-shaped electrode the lower the discharge may be for the electrode in the blind hole.

In regard to the above-described circulation of the dielectric, the electrode can be provided with through bores through which the dielectric can flow. The through bores can be subsequently sealed up again. The through bores are in one possible exemplification utilized for guiding a tie bar and/or for flushing tempering fluids for thermostating the central spindle. Usual tempering fluids are water and oil. The central spindle and drive journal are braced against one another by the tie bar. The tempering fluid, depending on the needs and/or desires, supplies heat to the central spindle or carries heat out of the central spindle.

The screw/central spindle is screwed into a corresponding screw thread in the drive journal to form a fixed connection on rotating in the working direction of the extruder.

A reverse rotation of the screw/extruder, however, does not release the screw/central spindle from the drive journal because a tie bar, that passes through the drive journal and the screw/central spindle, brace them against one another.

In at least one possible exemplification, the connection of the present application of the drive journal to the screw/central spindle obviates the need and/or desire for the grooves of a splined shaft. This simplifies the manufacture of the connection. Surprisingly, in this way a 30% increase in torque, for example, can be transferred by means of the connection.

Another significant advantage results from the simplified manufacture and inventory levels. Long bars can be manufactured, from which the central spindles can be cut to the required and/or desired length. In other words, instead of having to manufacture each central spindle with a specific design customized for a specific extruder or extruding operation, one type of central spindle can be manufactured that can be modified with different types of sleeves as desired.

The present application is not solely applicable to extruders that have the design of a planetary roller extruder over their whole length, i.e. in all sections. The present application is also applicable to other extruders that comprise a plurality of sections, wherein the section, in which the feedstock is fed to the extruder, is called the feed section and is designed as a single screw. A typical single screw possesses screw flights on a core. The screw flights can be formed integrally with the core. The screw flights can also be detachably seated on the core with sleeves. The core can be a clampable armature.

For one-piece single screws the present application is also applicable to the connection of the single screw to the drive journal. Then, the drive journal, equipped with an inner toothing, encompasses the screw on the outer periphery.

Optionally, the feed section has another design: the central spindle continues through the single screw designed as a sleeve. The central spindle is provided with toothing from one end to the other end. The drive pinion encompasses the drive-side end of the central spindle with an inner toothing in the above described manner. The sleeve that forms the single screw is seated with an inner thread on the central spindle. The inner thread can be manufactured in the same way as the inner thread in the drive journal. This includes the incorporation of the inner toothing by electrical discharge machining on the inner casing of the sleeve that forms the single screw.

The sleeves that form the single screw are optionally provided on the inside with inner toothed linings. The liners are prepared with the inner toothing and in one possible exemplification shrunk into the sleeves that form the single screw. When shrinking the liners in, the sleeve that forms the single screw is heated up until the liners can be slid in. In at least one one possible exemplification, the thermal stress involved with the shrinking process is almost negligible if the sleeve that forms the single screw is heated by induction. Advantageously, with inductive heating, those material zones of the sleeves that form the single screw and which have to be heated can be precisely or essentially precisely determined. The increase in diameter associated with the heating can be very slight. Depending on the diameter, the expansion can be in the region of hundredths to tenths of a millimeter.

The inner toothing of the liners can be carried out in the same way as the above described inner toothing of the drive journal.

A central spindle can also be optionally provided that is separate from the single screw and which is screwed into the central spindle side screw end, whereas the screw at the drive side is screwed into the gear journal.

The assembly of the central spindle according to the present application depends on the other characteristics of the extruder.

Usually, all or most or some extruders comprise various sections. In this regard, all or most or some sections may possess a planetary roller extruder design, such that the central spindle extends through all or most or some sections. Then the central spindle can be assembled first. The central spindle that is screwed to the drive journal is secured by a tie bar that clamps the central spindle against the drive journal.

The various sections can be assembled one after the other, starting with the drive side housing. The housings are usually cylindrical in shape and have flanges at the ends. The drive-side housing can be fastened with the flange to the extruder drive/housing. The planetary spindles are then positioned in the housing and the above described thrust ring inserted on the still free end of the assembled additional housing. The next housing is then assembled by connecting its flange, which faces the already assembled housing/flange, with its still free flange. The already inserted thrust ring is clamped between these flanges. This is followed by the insertion of the planetary spindles and the insertion of the associated thrust ring.

The next extruder section is assembled like the previously discussed section.

There is no reason to fear that the threaded union would be released out of the drive journal when the central spindle rotates in the working direction, because the reaction forces of the planetary spindles press the central spindle against the drive journal. With a reverse rotation the central spindle is prevented, restricted, and/or minimized from being released out of the drive journal by the tie bar that clamps the central spindle to the drive journal. In other words, the central spindle can be rotated either in a direction to advance feedstock toward the output end of the extruder, i.e., the working direction, or in a direction opposite to the working direction. For example, the working direction might involve a clockwise or counterclockwise rotation, and the reverse rotation would be the opposite. The force exerted by the planetary spindles on the central spindle when the central spindle is rotating in the working direction press the central spindle against the drive journal to help in keeping the central spindle screwed into the drive journal. The force exerted by the tie bar when the central spindle is rotating in a reverse direction (opposite to the working direction) press the central spindle against the drive journal to help in keeping the central spindle screwed into the drive journal.

The central spindle can also extend through all or most or some sections if the extruder in the material feed zone possesses a section with a single screw design. An above-described sleeve-shaped screw provided with inner toothing can be screwed onto the central spindle that had already been screwed into the drive journal, until the screw abuts on the drive journal. Finally, the drive-side housing is mounted and the planetary spindles inserted.

If a pressure build-up is required and/or desired in front of the material entrance into the subsequent planetary roller extruder section, then a thrust ring is in one possible exemplification inserted into the open housing end. On assembling the next section, the thrust ring is clamped between the housing flanges that are fastened together.

In the case of a central spindle rotation in the working direction, the central spindle, as in the previously mentioned application, is held in the drive journal by the threaded union, by the reaction forces and also here by the provided tie bar. The tie bar also secures the central spindle in the reverse running direction. At the same time the thrust ring holds the sleeve that forms the single screw in position on the central spindle. If no thrust ring is used, the other components can hold the sleeve that forms the single screw in position on the central spindle.

The sleeve, in one possible exemplification, has such a large diameter that when the central spindle runs in reverse the sleeve can touch the planetary spindles on the front face, in one possible exemplification in the area that is smaller than the root circle. The root circle refers to the diameter in the deepest part of the toothing between two teeth.

If still another pressure build-up by means of a single screw is required and/or desired before the material exits from the extruder, then the central spindle can nonetheless extend through the associated section of the extruder and likewise be provided with an inner toothed, single screw-forming sleeve that is screwed to the central spindle.

DESCRIPTION OF EXEMPLIFICATION OR EXEMPLIFICATIONS

Figure 1:
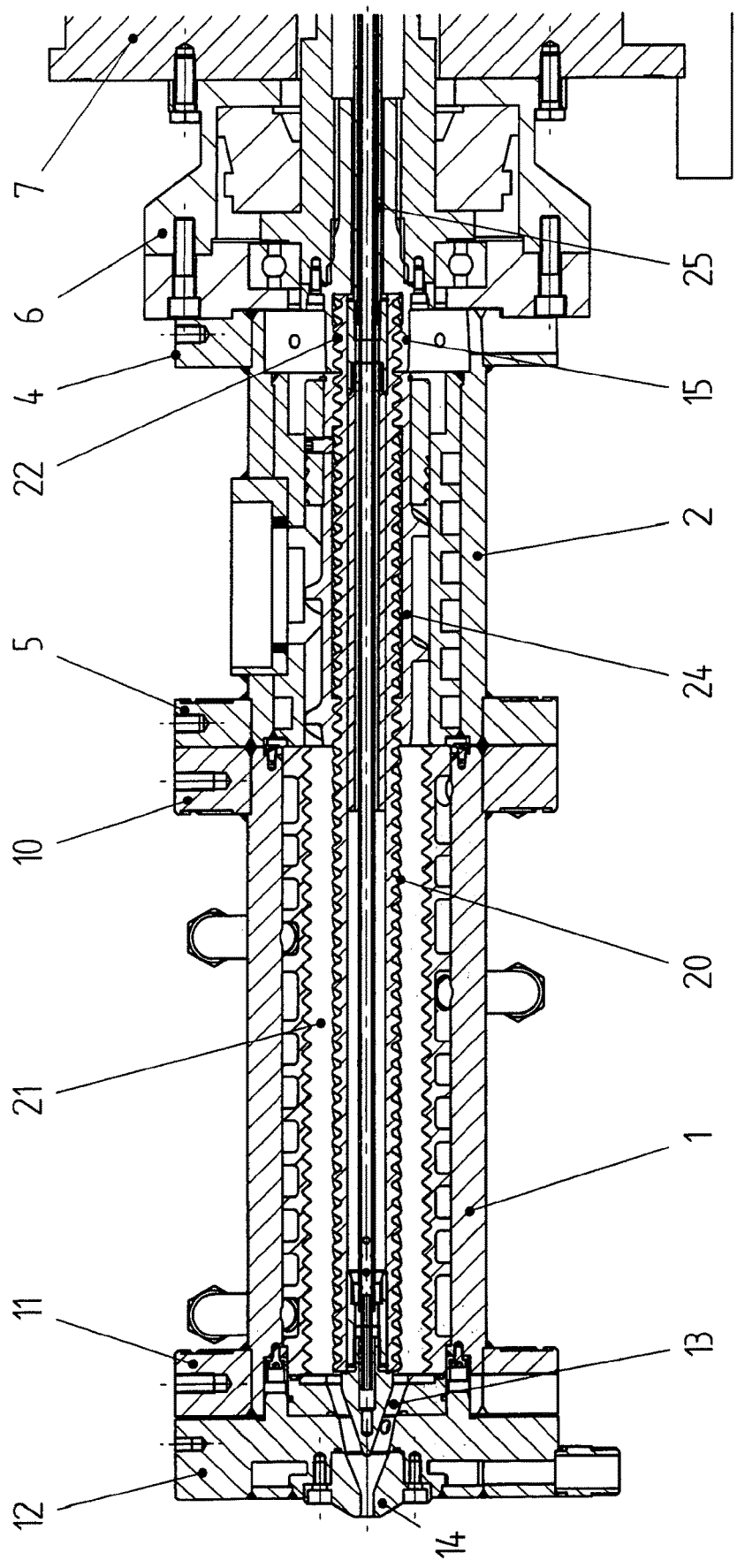
FIG. 1 shows an extruder according to one possible exemplification.

An exemplification of the present application is illustrated in the drawings. FIG. 1 shows an extruder that is made up of two extruder sections 1 and 2. Extruder section 2 is the feed section that includes a feed opening. The feedstock material is fed in granular form through the feed opening into the extruder.

The feed section possesses a cylindrical housing that is equipped with flanges 4 and 5 at the ends. The flange 5 is connected with the housing 6 of a drive 7. The connection is formed with screws or other suitable connecting structure.

Extruder section 1 is a planetary roller extruder section comprising a cylindrical housing with flanges 10 and 11 at each end. The flange 10 is connected by screwing to the flange 5. The other flange 11 is connected to a die plate 12, in which a changeable die 14 sits.

The planetary roller extruder section 1 also includes a central spindle 20, located centrally in the housing, and various planetary spindles 21 that are uniformly distributed around the central spindle 20 in the intermediate space between central spindle 20 and the surrounding housing. In this extruder section 1 the central spindle 20 is externally toothed, the housing is internally toothed, and the planetary spindles 21 are externally toothed. The various toothings match each other, such that the planetary spindles 21 can simultaneously mesh with the central spindle 20 and the toothing of the housing.

The central spindle 20 is uniformly toothed from one end to the other end.

In the exemplification shown, the central spindle 20 extends from the drive 7 up to the die plate 12, and therefore also through the section 2. The central spindle 20 engages into a drive journal or gear journal 15 in order to transfer the required and/or desired torque from the drive 7 onto the central spindle 20. The point or area of engagement is designated with 22. A threaded union between the drive journal/gear journal 15 and the central spindle 20 is provided at the point or area of engagement 22. Moreover, in the central spindle 20 there is provided a tie bar 25 that is clamped to the drive journal/gear journal 15.

On the central spindle 20 in the section 2 there is seated a sleeve 24 that also forms a feed screw/auger.

Figure 2:
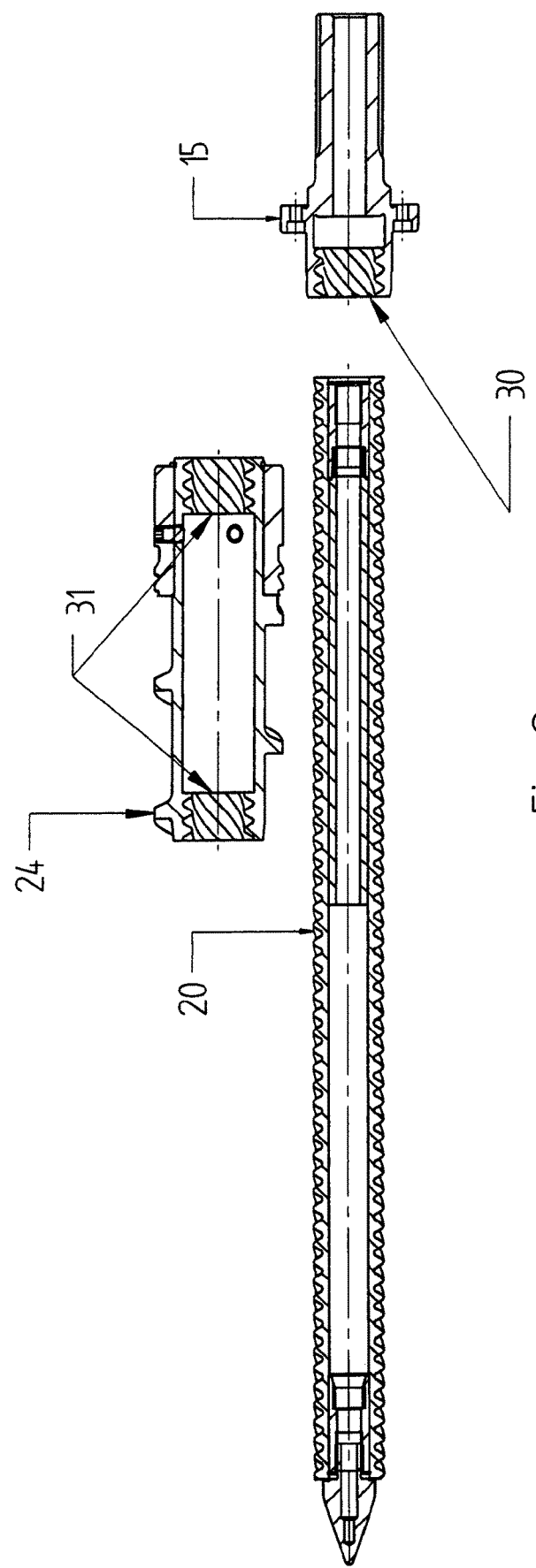
FIG. 2 shows a cross-sectional view of components of the extruder, separated from one another.
Figure 3:
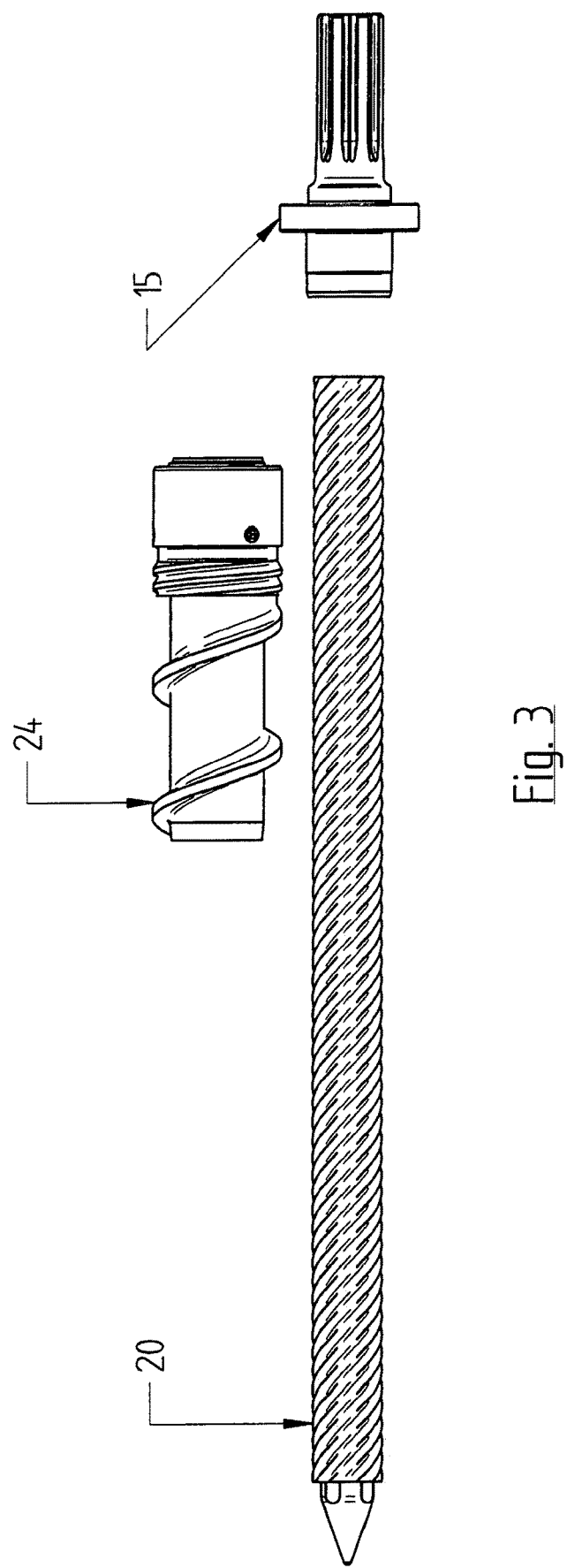
FIG. 3 shows a side view of the separated components shown in FIG. 2.
Figure 4:
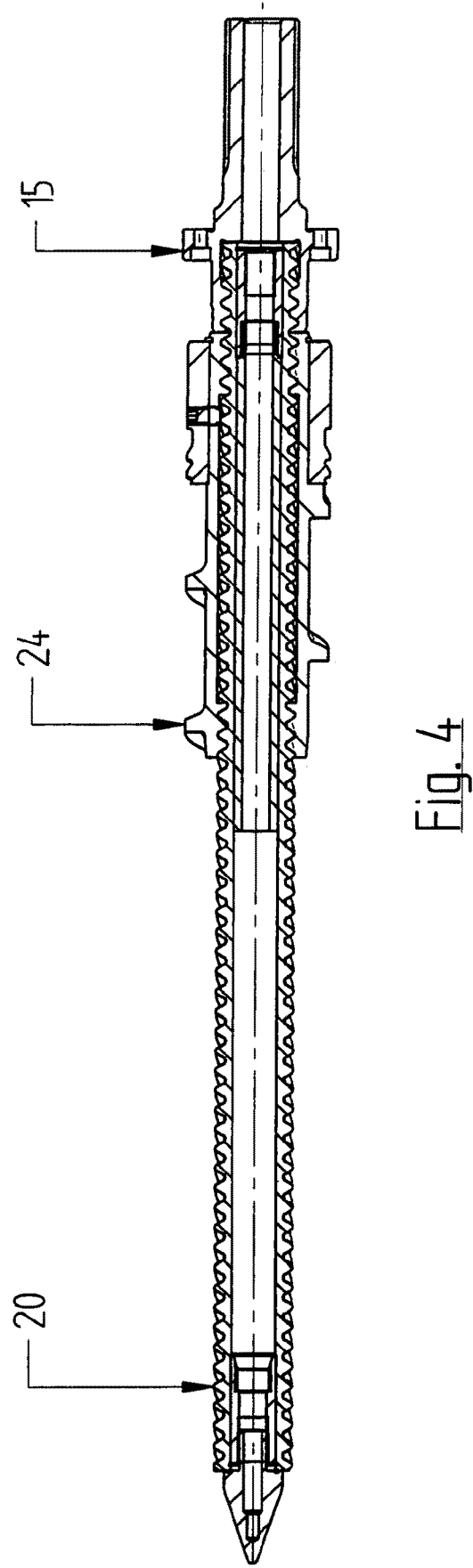
FIG. 4 shows a cross-sectional view of the components of the extruder shown in FIG. 2, connected together.
Figure 5:
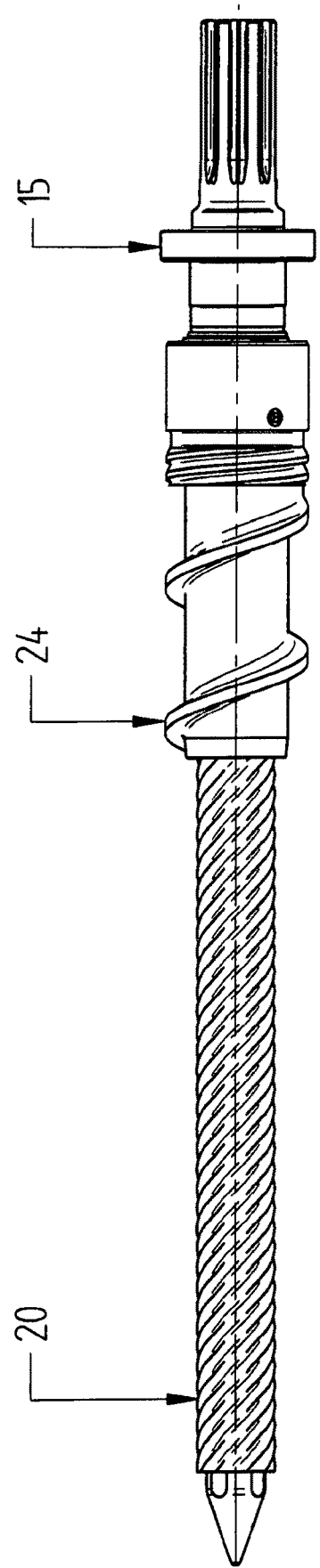
FIG. 5 shows a side view of the connected components shown in FIG. 4.

Various views of the central spindle 20, the sleeve 24 and the drive journal are illustrated in the FIGS. 2 to 5. FIGS. 3 and 5 show detailed views, whereas the FIGS. 2 and 4 show sectional illustrations. It can be clearly seen that the central spindle 20 possesses an external toothing. On the central spindle side, the drive journal/gear journal 15 possesses an internally-toothed bore 30. The inner toothing is matched to the external toothing of the central spindle 20. The matching is realized by choosing an appropriate inner diameter for the bore 30 and by preparing the required and/or desired tooth spaces in the inner casing of the journal 15.

The machining is carried out by electrical discharge machining. For the electrical discharge machining an electrode is moved into the bore of the journal 15. The electrode is disc-shaped and possesses—other than the distance required and/or desired for the electrical discharge machining—the same cross section as the central spindle. The electrode is surrounded by a dielectric liquid and different voltages impinge on the electrode and on the journal. The voltage difference is so great that a spark erosion occurs on the inner casing.

The inner toothing of the journal 15 enables the central spindle to be screwed in the journal 15.

The sleeve that forms the auger/feed screw possesses an inner toothing 31 at each end. The inner toothing was manufactured by spark erosion in the same way as the inner toothing was manufactured in the journal 15.

With the inner toothing, the sleeve 24 can be screwed onto the central spindle 20 and assembled with the central spindle 20, such that it is seated between the planetary spindles 21 of the section 1 and the journal 15.

The sleeve 24 can be manufactured to have a desired external toothing suitable for a particular extruder or extrusion process, while the central spindle 20 can have one type of toothing along the entire length thereof. In this manner, central spindles having one type of toothing can be mass produced, as well as matching drive journals. However, the central spindles can be easily customized by the use of sleeves that have a selected toothing. The central spindles can therefore be made in large, easily-stored batches, while the sleeves can be manufactured individually or in smaller batches according to customer requirements or a specific extrusion process or the feedstock to be processed, thereby reducing manufacture and storage costs.

In operation, feedstock, such as plastic with necessary and/or desired additives, adjuvants, and fillers, is fed in the feed section or extruder section 2, and then compressed and heated. In the exemplification, the mechanical stress of the plastic and the heat supplied already cause the plastic to melt. The feedstock is conveyed from the feed screw/auger into the extruder section 1 and mixed and homogenized between the central spindle 20, the planetary spindles 21, and the housing. At the same time the melt is tempered, such that it is collected in a space 13 at the end of the section 1, before exiting at a defined temperature through the die 14 out of the extruder.

Figure 6:
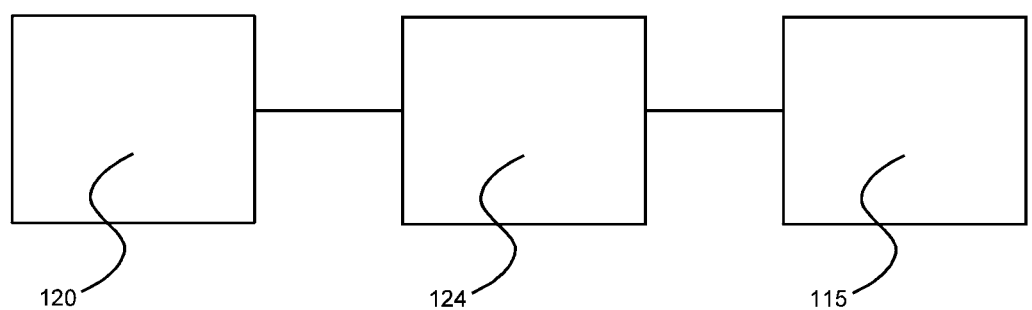
FIG. 6 shows a block diagram of components of an extruder according to one possible exemplification.

FIG. 6 shows a block diagram of components of an extruder according to one possible exemplification. In this exemplification, a central spindle 120 is connected to a single screw 124 by a screw-type connection. The single screw 124 is connected to a drive journal 115 by a screw-type connection. These extruder components differ from those shown in FIGS. 2-5. In FIGS. 2-5, the central spindle 120 extends through the sleeve 24, which acts as a single screw, and into the drive journal 15. In contrast, in FIG. 6, the single screw 124 connects the central spindle 120 to the drive journal 115. The screw-type connections between the different components can be similar to the screw connections shown in FIGS. 2-5, that is, by matching or meshing threads or toothings that engage with one another. In one exemplification, the single screw 124 can have internal toothings at either end, much like the sleeve 24. The central spindle 120 can have an external toothing that meshes with the internal toothing in one end of the single screw 124, and the drive journal 115 can have an external toothing that meshes with the internal toothing in the other end of the single screw 124. Alternatively, the ends of the single screw 124 could have an external toothing, while the central spindle 120 and the drive journal 115 each have an internal toothing. Finally, in another possible exemplification, a first end of the single screw 124 could have an external toothing, and a second end of the single screw 124 could have an internal toothing, and vice versa.

One feature or aspect of an exemplification is believed at the time of the filing of this patent application to possibly reside broadly in an extruder that is at least partly designed as a planetary roller extruder, wherein the part designed as the planetary roller extruder possesses an externally toothed central spindle, wherein the central spindle is surrounded by, and spaced apart from an inner toothed housing, and externally toothed planetary spindles revolve in the cavity between central spindle and housing, wherein the toothing of the planetary spindles meshes with both the inner toothing of the housing as well as with the external toothing of the central spindle, wherein the central spindle is coupled with a journal of the drive, wherein the journal of the drive is equipped with a toothed bore, whose toothing matches the external toothing of the central spindle and the central spindle is screwed in the journal.

Another feature or aspect of an exemplification is believed at the time of the filing of this patent application to possibly reside broadly in the extruder, wherein the central spindle also extends through extruder sections of different designs, and in one possible exemplification extends through sections that are designed as a single screw, wherein a sleeve is provided as the screw, said sleeve being externally provided with the screw flights, wherein the sleeve moreover possesses an inner toothing, whose toothing matches the external toothing of the central spindle, and the sleeve that forms the screw is screwed to the central spindle.

Yet another feature or aspect of an exemplification is believed at the time of the filing of this patent application to possibly reside broadly in the extruder, wherein the sleeve that forms the screw is provided with at least one inner toothed liner, in one possible exemplification two liners that are spaced apart from one another.

Still another feature or aspect of an exemplification is believed at the time of the filing of this patent application to possibly reside broadly in the extruder, wherein the sleeve that forms the screw is shrunk onto the inner toothed liner.

One feature or aspect of an exemplification is believed at the time of the filing of this patent application to possibly reside broadly in an extruder that is at least partly designed as a planetary roller extruder, wherein the part designed as the planetary roller extruder possesses a driven, externally toothed central spindle, wherein the central spindle is surrounded by, and spaced apart from an inner toothed housing, and externally toothed planetary spindles revolve in the cavity between central spindle and housing, wherein the toothing of the planetary spindles meshes with both the inner toothing of the housing as well as with the external toothing of the central spindle, wherein a feed section designed as a single screw belongs to the extruder, wherein the gear side end of the central spindle is screwed in the screw of the feed section, and the gear side end of the screw of the feed section is screwed to a journal of the drive, wherein the screw, on its central spindle side, is equipped with an inner toothed bore, whose toothing matches the external toothing of the central spindle.

Yet another feature or aspect of an exemplification is believed at the time of the filing of this patent application to possibly reside broadly in the extruder, wherein the extruder comprises the use of central spindles with uniform toothing.

Still another feature or aspect of an exemplification is believed at the time of the filing of this patent application to possibly reside broadly in the extruder, wherein the screw of the feed section for its part at the gear side possesses a journal provided with an external thread, the journal being screwed in a threaded bore of the gear journal or that the screw for its part at the gear side is equipped with a threaded bore, in which the gear journal with an external thread is screwed.

A further feature or aspect of an exemplification is believed at the time of the filing of this patent application to possibly reside broadly in the extruder, wherein the central spindle is clamped to the journal of the drive by a tie bar, wherein said tie bar is seated centrally in the hollow central spindle.

Another feature or aspect of an exemplification is believed at the time of the filing of this patent application to possibly reside broadly in an extruder, characterized by spark eroded inner toothings.

Yet another feature or aspect of an exemplification is believed at the time of the filing of this patent application to possibly reside broadly in the extruder, wherein the extruder comprises the use of an electrode for the spark erosion, wherein said electrode replicates the central spindle.

Still another feature or aspect of an exemplification is believed at the time of the filing of this patent application to possibly reside broadly in the extruder, wherein the extruder comprises the use of longer starting materials having external toothing, from which the central spindles are cut to length.

One feature or aspect of an exemplification is believed at the time of the filing of this patent application to possibly reside broadly in a planetary roller extruder comprising: a housing comprising an internal housing toothing; a central spindle being disposed in said housing and comprising an external central spindle toothing; a plurality of planetary spindles being disposed about said central spindle and in said housing; each of said planetary spindles comprising an external planetary spindle toothing configured to mesh with said internal housing toothing and said external central spindle toothing; a drive being configured to rotate said central spindle; said drive comprising a drive journal being connected to said central spindle to permit transmission of driving force from said drive to said central spindle; said drive journal comprising a bore; and said bore comprising internal projections configured to engage with said external central spindle toothing to secure said central spindle to said drive journal by a screw-type connection.

Another feature or aspect of an exemplification is believed at the time of the filing of this patent application to possibly reside broadly in the planetary roller extruder, wherein said housing comprises a first extruder section and a second extruder section; said central spindle is configured and disposed to extend through both said first extruder section and said second extruder section; said planetary spindles being disposed in said first extruder section; the planetary roller extruder comprises a single screw disposed in said second extruder section; said single screw comprises a sleeve disposed on and around a portion of said central spindle; said sleeve comprises an external sleeve toothing; and said sleeve comprises internal projections configured and disposed to engage with said external central spindle toothing to secure said sleeve to said central spindle.

Yet another feature or aspect of an exemplification is believed at the time of the filing of this patent application to possibly reside broadly in the planetary roller extruder, wherein said internal projections of said bore in said drive journal comprise an internal bore toothing configured and disposed to mesh with said external central spindle toothing.

Still another feature or aspect of an exemplification is believed at the time of the filing of this patent application to possibly reside broadly in the planetary roller extruder, wherein said internal projections of said sleeve comprise an internal sleeve toothing configured and disposed to mesh with said external central spindle toothing.

A further feature or aspect of an exemplification is believed at the time of the filing of this patent application to possibly reside broadly in the planetary roller extruder, wherein: said sleeve comprises a body portion and a liner portion disposed within said body portion; said internal sleeve toothing is formed as part of said liner portion; and said liner portion comprises a single liner structure.

Another feature or aspect of an exemplification is believed at the time of the filing of this patent application to possibly reside broadly in the planetary roller extruder, wherein said body portion of said sleeve is shrunk onto said liner portion.

Yet another feature or aspect of an exemplification is believed at the time of the filing of this patent application to possibly reside broadly in the planetary roller extruder, wherein said central spindle comprises uniform toothing along its entire length.

Still another feature or aspect of an exemplification is believed at the time of the filing of this patent application to possibly reside broadly in the planetary roller extruder, wherein: the planetary roller extruder comprises a tie bar configured and disposed to clamp said central spindle to said drive journal; and said tie bar is disposed in an elongated hollow space in said central spindle.

A further feature or aspect of an exemplification is believed at the time of the filing of this patent application to possibly reside broadly in the planetary roller extruder, wherein each of said internal sleeve toothing and said internal bore toothing comprise a spark-eroded inner toothing.

Another feature or aspect of an exemplification is believed at the time of the filing of this patent application to possibly reside broadly in the planetary roller extruder, wherein said second extruder section comprises a feed section into which feedstock is first fed into the planetary roller extruder via a feed opening.

Yet another feature or aspect of an exemplification is believed at the time of the filing of this patent application to possibly reside broadly in the planetary roller extruder, wherein: said sleeve comprises a body portion and a liner portion disposed within said body portion; said internal sleeve toothing is formed as part of said liner portion; and said liner portion comprises a two liner structures separated apart from one another.

Still another feature or aspect of an exemplification is believed at the time of the filing of this patent application to possibly reside broadly in the planetary roller extruder, wherein said body portion of said sleeve is shrunk onto said liner portion.

A further feature or aspect of an exemplification is believed at the time of the filing of this patent application to possibly reside broadly in the planetary roller extruder, wherein said central spindle comprises uniform toothing along its entire length.

One feature or aspect of an exemplification is believed at the time of the filing of this patent application to possibly reside broadly in a planetary roller extruder comprising: a housing comprising an internal housing toothing; said housing comprising an extruder section and a feed section; a central spindle being disposed in said extruder section and comprising an external central spindle toothing; a plurality of planetary spindles being disposed about said central spindle and in said housing; each of said planetary spindles comprising an external planetary spindle toothing configured to mesh with said internal housing toothing and said external central spindle toothing; a single screw being disposed in said feed section; a drive being configured to rotate said single screw; said single screw comprising a first end being connected to said drive, and a second end being connected to said central spindle to permit said drive to rotate both said single screw and said central spindle together; said first end of said single screw and said drive being screwed together; said second end of said single screw comprising a bore; and said bore comprising internal projections configured to engage with said external central spindle toothing to secure said central spindle and said single screw together by a screw-type connection.

Another feature or aspect of an exemplification is believed at the time of the filing of this patent application to possibly reside broadly in the planetary roller extruder, wherein one of (A) and (B): (A) said first end of said single screw comprises an external threading; said drive comprises a drive journal; said drive journal comprises a bore; and said bore comprises internal projections configured to engage with said external threading of said first end of said single screw to secure said single screw to said drive journal by a screw-type connection; and (B) said drive comprises a drive journal; said drive journal comprises an external threading; said first end of said single screw comprises a bore; and said bore comprises internal projections configured to engage with said external threading of said drive journal to secure said drive journal to said first end of said single screw by a screw-type connection.

Yet another feature or aspect of an exemplification is believed at the time of the filing of this patent application to possibly reside broadly in the planetary roller extruder, wherein said central spindle comprises uniform toothing along its entire length.

Still another feature or aspect of an exemplification is believed at the time of the filing of this patent application to possibly reside broadly in the planetary roller extruder, wherein: the planetary roller extruder comprises a tie bar configured and disposed to clamp said central spindle to said drive journal; and said tie bar is disposed in an elongated hollow space in said central spindle.

A further feature or aspect of an exemplification is believed at the time of the filing of this patent application to possibly reside broadly in the planetary roller extruder, wherein each of said internal sleeve toothing and said internal bore toothing comprises a spark-eroded inner toothing.

Another feature or aspect of an exemplification is believed at the time of the filing of this patent application to possibly reside broadly in the planetary roller extruder, wherein each of said internal sleeve toothing and said internal bore toothing comprises an electrode-spark-eroded inner toothing.

Yet another feature or aspect of an exemplification is believed at the time of the filing of this patent application to possibly reside broadly in the planetary roller extruder, wherein said central spindle comprises a section separated from a longer piece of central spindle material.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patents, patent applications, patent publications, and other documents, except of the exceptions indicated herein, are hereby incorporated by reference as if set forth in their entirety herein except for the exceptions indicated herein, as follows: DE2521774 A1, having applicant EICKHOFF KLEINEWEFERS KUNSTSTO, published on Nov. 25, 1977; and DE4433487 C2, having applicant RUST & MITSCHKE ENTEX, published on Jul. 2, 1998.

All of the patents, patent applications, patent publications, and other documents, except for the exceptions indicated herein, which were cited in the INTERNATIONAL SEARCH REPORT dated Jul. 22, 2016, and/or cited elsewhere, as well as the INTERNATIONAL SEARCH REPORT document itself, are hereby incorporated by reference as if set forth in their entirety herein except for the exceptions indicated herein, as follows: DE3815061 C1, having applicant HERMANN BERSTORFF MASCHINENBAU GMBH, published on Apr. 20, 1989; and DE202010017571 U1, having applicant RUST & MITSCHKE ENTEX, published on Feb. 27, 2012.

The corresponding foreign and international patent publication applications, namely, Federal Republic of Germany Patent Application No. 10 2015 012 435.8, filed on Sep. 27, 2015, having inventor Harald RUST, and DE-OS 10 2015 012 435.8 and DE-PS 10 2015 012 435.8, and International Application No. PCT/EP2016/000666, filed on Apr. 27, 2016, having WIPO Publication No. WO 2017/050400 and inventor Harald RUST, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2016/000666 and German Patent Application 10 2015 012 435.8, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2016/000666 and DE 10 2015 012 435.8 from which this patent application claims priority which do not have to do with the correction of the translation in this patent application are not to be included in this patent application in the incorporation by reference.

Any statements about admissions of prior art in the original foreign patent applications PCT/EP2016/000666 and DE 10 2015 012 435.8 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

While various aspects and exemplifications have been disclosed herein, other aspects and exemplifications are contemplated. The various aspects and exemplifications disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A planetary roller extruder comprising:
   a housing comprising an internal housing toothing;
   a central spindle being disposed in said housing and comprising an external central spindle toothing;
   a plurality of planetary spindles being disposed about said central spindle and in said housing;
   each of said planetary spindles comprising an external planetary spindle toothing configured to mesh with said internal housing toothing and said external central spindle toothing;
   a drive being configured to rotate said central spindle;
   said drive comprising a drive journal being connected to said central spindle to permit transmission of driving force from said drive to said central spindle;
   said drive journal comprising a bore; and
   said bore comprising internal projections configured to engage with said external central spindle toothing to secure said central spindle to said drive journal by a screw-type connection.

2. The planetary roller extruder according to claim 1, wherein:
   said housing comprises a first extruder section and a second extruder section;
   said central spindle is configured and disposed to extend through both said first extruder section and said second extruder section;
   said planetary spindles being disposed in said first extruder section;
   the planetary roller extruder comprises a single screw disposed in said second extruder section;
   said single screw comprises a sleeve disposed on and around a portion of said central spindle;
   said sleeve comprises an external sleeve toothing; and
   said sleeve comprises internal projections configured and disposed to engage with said external central spindle toothing to secure said sleeve to said central spindle.

3. The planetary roller extruder according to claim 2, wherein said internal projections of said bore in said drive journal comprise an internal bore toothing configured and disposed to mesh with said external central spindle toothing.

4. The planetary roller extruder according to claim 3, wherein said internal projections of said sleeve comprise an internal sleeve toothing configured and disposed to mesh with said external central spindle toothing.

5. The planetary roller extruder according to claim 4, wherein:
   said sleeve comprises a body portion and a liner portion disposed within said body portion;
   said internal sleeve toothing is formed as part of said liner portion; and
   said liner portion comprises a single liner structure.

6. The planetary roller extruder according to claim 5, wherein said body portion of said sleeve is shrunk onto said liner portion.

7. The planetary roller extruder according to claim 6, wherein said central spindle comprises uniform toothing along its entire length.

8. The planetary roller extruder according to claim 7, wherein:
   the planetary roller extruder comprises a tie bar configured and disposed to clamp said central spindle to said drive journal; and
   said tie bar is disposed in an elongated hollow space in said central spindle.

9. The planetary roller extruder according to claim 8, wherein each of said internal sleeve toothing and said internal bore toothing comprise a spark-eroded inner toothing.

10. The planetary roller extruder according to claim 2, wherein said second extruder section comprises a feed section into which feedstock is first fed into the planetary roller extruder via a feed opening.

11. The planetary roller extruder according to claim 4, wherein:
   said sleeve comprises a body portion and a liner portion disposed within said body portion;
   said internal sleeve toothing is formed as part of said liner portion; and
   said liner portion comprises a two liner structures separated apart from one another.

12. The planetary roller extruder according to claim 11, wherein said body portion of said sleeve is shrunk onto said liner portion.

13. The planetary roller extruder according to claim 12, wherein said central spindle comprises uniform toothing along its entire length.

14. A planetary roller extruder comprising:
   a housing comprising an internal housing toothing;
   said housing comprising an extruder section and a feed section;
   a central spindle being disposed in said extruder section and comprising an external central spindle toothing;
   a plurality of planetary spindles being disposed about said central spindle and in said housing;
   each of said planetary spindles comprising an external planetary spindle toothing configured to mesh with said internal housing toothing and said external central spindle toothing;
   a single screw being disposed in said feed section;
   a drive being configured to rotate said single screw;

said single screw comprising a first end being connected to said drive, and a second end being connected to said central spindle to permit said drive to rotate both said single screw and said central spindle together;

said first end of said single screw and said drive being screwed together;

said second end of said single screw comprising a bore; and said bore comprising internal projections configured to engage with said external central spindle toothing to secure said central spindle and said single screw together by a screw-type connection.

15. The planetary roller extruder according to claim 14, wherein one of (A) and (B):

(A) said first end of said single screw comprises an external threading;

said drive comprises a drive journal;

said drive journal comprises a bore; and said bore comprises internal projections configured to engage with said external threading of said first end of said single screw to secure said single screw to said drive journal by a screw-type connection; and (B) said drive comprises a drive journal;

said drive journal comprises an external threading;

said first end of said single screw comprises a bore; and said bore comprises internal projections configured to engage with said external threading of said drive journal to secure said drive journal to said first end of said single screw by a screw-type connection.

16. The planetary roller extruder according to claim 15, wherein said central spindle comprises uniform toothing along its entire length.

17. The planetary roller extruder according to claim 16, wherein:

the planetary roller extruder comprises a tie bar configured and disposed to clamp said central spindle to said drive journal; and said tie bar is disposed in an elongated hollow space in said central spindle.

18. The planetary roller extruder according to claim 17, wherein each of said internal sleeve toothing and said internal bore toothing comprises a spark-eroded inner toothing.

19. The planetary roller extruder according to claim 18, wherein each of said internal sleeve toothing and said internal bore toothing comprises an electrode-spark-eroded inner toothing.

20. The planetary roller extruder according to claim 19, wherein said central spindle comprises a section separated from a longer piece of central spindle material.

* * * * *